United States Patent Office 3,070,451
Patented Dec. 25, 1962

3,070,451
WATER-SOLUBLE THERMOPLASTIC CELLULOSE ETHER COMPOSITIONS AND FILMS PREPARED THEREFROM
Garth H. Beaver and Lawrence D. Zerone, Midland, Mich., assignors to The Dow Chemical Company, Midland, Mich., a corporation of Delaware
No Drawing. Filed Sept. 18, 1959, Ser. No. 840,790
11 Claims. (Cl. 106—181)

This invention relates to improved water-soluble thermoplastic compositions based on certain cellulose ethers. More particularly it relates to such compositions comprising hydroxylalkyl alkyl cellulose ethers and certain plasticizers. The invention further contemplates the provision of films, sheets, foils, and the like shaped articles, as well as coatings for cellulosic or similar substrata, which articles and coatings have been prepared from said compositions.

A satisfactory method for the fabrication by thermal means, such as extrusion, of flexible and of rigid articles, such as films and sheets from water-soluble cellulose ethers has long been desired. It has also been desired to have thermoplastic compositions based on water-soluble cellulose ethers which could be formed by conventional methods and means into heat-sealable films and sheets. Heat sealability would allow for expanded exploitation of such cellulose ether films and sheets into areas of the packaging field from which such films and sheets have been heretofore barred by reason of unsuitablility for such purpose.

Thermoplastic compositions made from normally non-thermoplastic, water-soluble cellulose ethers are known. These, however, usually require such large amounts of plasticizer that rigid articles cannot be produced therefrom except by forming the compositions into very thick sections of obviously limited applicability. When either films or sheets of such compositions are desired, it is necessary to cast or to dip the normally non-thermoplastic ethers from an aqueous solution that generally contains a small amount of a humectant and subsequently to evaporate the water therefrom. Because of the unique solubility characteristics of most of the cellulose ethers in water, the fabrication of shaped articles from aqueous solutions is very difficult to control.

It would obviously be desirable and highly advantageous if existing thermal fabricating equipment and methods as well as conventional casting techniques could be employed to form such articles. It would also be desirable if films and sheets of hydroxyalkyl alkyl cellulose ethers could be heat sealed using frequently practiced techniques with existing apparatus.

The achievement of desired optimum overall characteristics and properties in any water-soluble thermoplastic cellulose ether composition involves taking into account many more consideration and factors than the thermoplasticity and heat sealability mentioned above.

Thus, as is generally true with resinous compositions, it is desirable to blend a plasticizer with the resin to achieve optimum properties. Any plasticizer must satisfy all of the requirements of such an agent in being compatible with and chemically inert to all ingredients of the composition. It must have optimum plasticizing effectiveness at the temperatures of fabrication and use. It should be colorless, odorless, tasteless, and non-toxic. These and other known requirements preclude the predictability of the successful function of any given compound as a plasticizer in the above type of composition.

The predominating objective of the present invention is to provide a composition of the mentioned type than is readily capable of fulfilling the above-discussed primary requirements and considerations.

It is also a principal object of this invention to provide improved plasticized hydroxyalkyl alkyl cellulose ether compositions.

A further object of the invention is to provide such compositions which, even after having been fabricated, are water-soluble and thermoplastic.

Yet another object is the provision of a water-soluble thermoplastic film based on a cellulose ether.

Still another object is the provision of such a film which can be heat sealed.

The above and related objects are accomplished by using compositions consisting essentially of certain water-soluble, thermoplastic hydroxyalkyl alkyl cellulose ethers (as are hereinafter more fully described) and plasticizing amounts of a hydroxypropyl derivative of pentaerythritol.

The stated objects are further realized with films prepared from said compositions.

The cellulose ethers which are useful in carrying out the invention are those hydroxyalkyl alkyl cellulose ethers in which the hydroxyalkyl groups have from 2 to about 4 carbon atoms, the alkyl groups have from 1 to about 3 carbon atoms, and which melt at a temperature appreciably below their decomposition temperature, and which are soluble in water and certain organic solvents.

Typical examples of useful ethers are the hydroxyethyl methyl and hydroxypropyl methyl ethers of cellulose when etherified to the extent that is described in greater detail in the ensuing specification. The mentioned ethers, among others, are commercially available materials which are not only inexpensive but have unusally good properties. Use thereof in practice of the instant invention is, accordingly, of decided benefit and advantage.

Cellulose ethers satisfying the above-specifications may be prepared by processes as described in United States Letters Patent Nos. 2,831,852 and 2,835,666. As therein disclosed, the ethers may be prepared by an earlier known two-step process, even though a one-step process is preferred.

In an illustrtaive example of such more desirable process as is referred to in the mentioned patents, cellulose is treated with from about 30 to about 60 weight percent, based on cellulose weight, of an aqueous caustic soda (i.e. NaOH) solution to give an alkali cellulose with a ratio of from about 0.7 to about 1.5 parts by weight of combined sodium hydroxide (NaOH) per part of cellulose. The alkali cellulose is then mixed with from about 1.1 to about 2.0 parts of methyl chloride per part of cellullose and with about 0.45 to about 0.50 part of propylene oxide (or its molar equivalent of ethylene oxide) per part of cellulose at a temperature below about 40° C. for a short time. This is followed by reaction at a temperature of about 60° C., or higher, until etherification is substantially complete. The product is finally washed with hot water at a temperature above its aqueous gel point to move water-soluble impurities.

In general, the cellulose ethers useful in practice of the present invention have from about 7 to about 10 percent hydroxypropoxy substitution or the corresponding equivalent substitution for hydroxyethoxy or hydroxybutoxy. In instances when the last mentioned substituents are involved, slightly less hydroxybutoxy substitution, generally as little as about 4 weight percent, may be tolerated. The ethers also contain from about 28 to about 30 weight percent of methoxy substituents therein, or the corresponding equivalent substitution of ethoxy or propoxy.

It is common practice to characterize ethers of the presently contemplated type by their principal chemical and physical properties, including melting point of an ether or gel point of its water solutions. For purposes of selecting ethers best adapted for use in practice of the present invention, the existence of the desired degree of etherification is most conveniently determined by measuring the softening, melting and decomposition temperatures of the cellulose ether product. The referred-to temperature characteristics are easily determined by means of a melting bar which has progressively increasing temperatures along its length. In employing such a device, several appropriately small portions of a given film of constant thickness are prepared in suitable spaced relationship at various points along the bar. For use in practice of the present invention, the mixed ethers should have a spread of at least about 10, and preferably at least about 20, centigrade degrees between melting and decomposition temperatures.

Suitable cellulose ethers are also found to have gel points in water that are between those of the ordinarily available alkyl celluloses and the corresponding commercially obtainable hydroxyalkyl alkyl celluloses. For example the methyl celluloses of commerce have aqueous gel points of from about 45 to about 50° C. The commercial hydroxypropyl methyl celluloses have aqueous gel points above about 65° C. Mediate therebetween, the hydroxypropyl methyl cellulose ethers employed in practice of the present invention have gel points of about 55° C. The suitable ethyl, propyl, and butyl derivatives show similar gel points, characteristics and properties in aqueous solution.

The essential plasticizers employed in the compositions of the present invention are the hydroxypropyl pentaerythritols. Either the mono-, di-, tri-, or tetra-substituted pentaerythritols, or mixtures thereof, may be utilized with about equally successful results. Such derivatives are easily prepared by known organic syntheses such as that which is disclosed in the copending application for United States Letters Patent of Arthur W. Anderson having Serial No. 630,067 which was filed December 24, 1956, now U.S. Patent No. 2,927,918.

The amount of cellulose ether that may be used in the thermoplastic compositions of this invention may be varied within relatively wide limits. The actual concentration to be employed depends upon the properties desired in the finished article, as well as on the method of fabrication to be followed and the viscosity grade of the cellulose ether used. To a lesser degree, the choice of the mono-, di-, tri- or tetra-substituted derivative will affect the optimum concentration that is involved.

For compression molding, vacuum drawing, extrusion and like operations to prepare relatively thick sections of the composition, wherein flexibility is ordinarily of minimum importance, it is possible to use as little as about 5 weight percent of the plasticizer. However, when relatively thin, flexible films are to be prepared, from about 10 to about 50 weight percent of the plasticizer, based on the combined weight of cellulose either and plasticizer, may be employed with advantage.

Optimum results are generally attained when the hydroxypropyl pentaerythritol plasticizer is used in a concentration of from about 20 to about 30 weight percent. The properties of films prepared from compositions containing greater than about 50 weight percent of plasticizer oftentimes are of such marked inferiority, especially in tensile strength and moisture vapor transmission characteristics, that use thereof is disadvantageous, particularly if standards of commercial acceptability must be met.

When the thermoplastic cellulose ether compositions of the present invention are employed, smaller amounts of plasticizer are required therein to give a satisfactory moldable composition than when compositions are prepared with non-thermoplastic cellulose ethers. It is also possible to prepare moldable compositions with but a single plasticizer without requiring complex mixtures of plasticizers as are needed for compositions of the non-thermoplastic cellulose ethers. Of course, mixtures of plasticizers may be employed if desired. In fact, such mixtures are frequently of particular benefit to achieve special effects in the presently contemplated compositions of thermoplastic cellulose ethers.

Thus the ester plasticizers employed in practice of the present invention may conveniently be used in combination with glycerine and propylene glycol without losing the desired properties of thermoplasticity and heat sealability. When combinations of plasticizer are used, the concentration of combined plasticizer should be between about 10 and about 50 weight percent of the combined weight of said plasticizer and cellulose ether. Of the total weight of the composition, there must be at least 5 weight percent of the hydroxypropyl pentaerythritol plasticizer to ensure the desired results. If less than such an amount of the desired plasticizing pentaerythritol derivative is present, the advantageous heat sealing and adhesive properties will be significantly reduced. This minimum of 5 percent of plasticizer applies regardless of whether the hydroxypropyl pentaerythritol is used alone or in combination with other plasticizers.

The plasticizers employed in practice of the present invention, in addition to providing excellent plasticization efficiency, are noteworthy in being substantially tasteless, odorless and in exhibiting no undesirable effects resulting from ingestion. As is apparent, such properties are essential if use is to be made of a composition in the food packaging industry.

In addition, as has been indicated, the films prepared from the compositions of this invention are singularly outsanding in being capable of being readily heat sealed with conventional equipment and procedures, such as use of bar type heat sealers. This allows the films to be employed for applications where hermetically sealed closures free from foreign adhesives and the like are required.

The compositions of the present invention, as mentioned, may be thermally fabricated by extrustion, molding, and similar operations into clear, transparent, water-soluble films, sheets, or other forms. In certain instances as where a water-insoluble secondary plasticizer (such as tributyl citrate) is employed, it is of considerable advantage to use thermal fabrication means to avoid any possibility of hazy appearance that might result from casting from aqueous solutions, such as solutions in water, mixtures of water and methanol, mixtures of benzene and methanol containing small quantities of water, and so forth. Despite this, even hazy films of the present compositions have the indicated desirable heat sealing properties. Satisfactory heat sealable films may also be prepared by casting the compositions from non-aqueous solutions thereof in solvent mixtures of benzene and methanol and the like.

The advantages and benefits of the present compositions and shaped articles, such as films, thereof are more apparent from the following illustrative examples, wherein, unless otherwise indicated, all parts and percentages are on a weight basis.

EXAMPLE 1

Several compositions pursuant to the present invention were prepared from a hydroxypropyl methyl cellulose containing from about 7 to 10 percent hydroxypropoxy substitution and from about 28 to 30 percent methoxyl substitution. Various plasticizers and combinations thereof were dry blended with the cellulose ethers. Solutions of the compositions were prepared in a solvent mixture of about 80 percent methanol/20 percent water. Each of the solutions contained, in addition to the plasticizer component, in the neighborhood of 8 percent dissolved cellulose ether, based on total weight of solution. Films of the composition were then cast from the solutions thereof on glass plates. The film samples (each having an average thickness of about 2½ mils) were finally dried and stripped from the plates for subsequent testing.

The tensile strengths and elongations of the several dried film samples were determined. In addition, the ability of each of the films to heat seal was determined with a bar type sealer. A heat seal temperature above 200° C. is so high as to be considered commercially unacceptable.

All of the films prepared (excepting those containing tributyl citrate) were transparent and clear, thermoplastic, and water soluble. The tributyl citrate-containing films were somewhat hazy.

The results of the described operations are set forth in the following tabulation:

*Table I*

| Sample No. | Hydroxy-propyl pentaerythritol | Glycerine | Propylene glycol | Acetyl tributyl citrate | Tensile strength, p.s.i. | Elongation, percent | Heat seal temp., °C. |
|---|---|---|---|---|---|---|---|
| 1 | 20 | | | | 4,430 | 33 | |
| 2 | 30 | | | | 3,400 | 44 | 160 |
| 3 | 40 | | | | 2,380 | 79 | 150 |
| 4 | 15 | 15 | | | 2,750 | 51 | 150 |
| 5 | 10 | 10 | 10 | | 3,920 | 41 | 150 |
| 6 | | 30 | | | | | (¹) |
| 7 | | | | 30 | | | 200 |

¹ Could not be heat sealed.

EXAMPLE 2

Compositions were prepared by dry blending the cellulose ether of Example 1 with from 25 to 40 percent hydroxypropyl pentaerythritol. The compositions were preheated for about 4 minutes and then thermally extruded into films at about 190° C. The films were clear and water soluble.

What is claimed is:

1. A thermoplastic composition consisting essentially of (1) between about 50 and about 95 weight percent, based on composition weight, of a water-soluble, thermoplastic, hydroxyalkyl alkyl cellulose ether in which the hydroxyalkyl group contains from 2 to about 4 carbon atoms, the alkyl group contains from 1 to about 3 carbon atoms, and which has a melting point which is at least 10 centigrade degrees below the decomposition temperature and (2) between about 50 to about 5 weight percent, based on composition weight, of a plasticizer for said cellulose ether, said composition consisting essentially of between about 5 and about 40 weight percent, based on the combined weight of said cellulose ether and plasticizer, of a hydroxypropyl derivative of pentaerythritol, any balance of said plasticizer being another plasticizer for said cellulose ether that is miscible with said pentaerythritol plasticizer and compatible in said composition.

2. The composition of claim 1, wherein said hydroxyalkyl alkyl cellulose ether is a hydroxypropyl methyl cellulose containing from 7 to about 10 weight percent, based on ether weight, of hydroxypropoxy substituents and from about 28 to about 30 weight percent, based on ether weight, of methoxy substituents.

3. A thermoplastic composition according to claim 1, wherein said plasticizer consists of a hydroxypropyl derivative of pentaerythritol contained in said composition in an amount between about 5 and about 40 weight percent, based on composition weight.

4. A thermoplastic composition according to claim 3, wherein said plasticizer is present in a concentration of from about 20 to about 30 weight percent.

5. A thermoplastic composition according to claim 1, wherein said plasticizer is a mixture of a hydroxypropyl derivative of pentaerythritol and glycerine.

6. A thermoplastic composition according to claim 1, wherein said plasticizer is a mixture of a hydroxypropyl derivative of pentaerythritol and propylene glycol.

7. A thermoplastic composition according to claim 1, wherein said plasticizer is a mixture of a hydroxypropyl derivative of pentaerythritol, propylene glycol and glycerine.

8. A thermoplastic composition according to claim 1, wherein said plasticizer is a mixture of a hydroxypropyl derivative of pentaerythritol and tributyl citrate.

9. A water-soluble, heat-sealable, transparent film of a composition according to claim 1.

10. A film of the composition of claim 2.

11. A film of the composition of claim 3.

References Cited in the file of this patent

UNITED STATES PATENTS

| | | |
|---|---|---|
| 2,602,755 | Silvernail | July 8, 1952 |
| 2,810,659 | Greminger et al. | Oct. 22, 1957 |
| 2,839,419 | Windover et al. | June 17, 1958 |
| 2,849,328 | Swinehart et al. | Aug. 26, 1958 |

OTHER REFERENCES

Buttrey, "Plasticizers," second edition, 1957, page 120.